US009858268B2

(12) United States Patent
Huang et al.

(10) Patent No.: US 9,858,268 B2
(45) Date of Patent: *Jan. 2, 2018

(54) CHINESE NAME TRANSLITERATION

(71) Applicant: International Business Machines Corporation, Armonk, NY (US)

(72) Inventors: Shudong Huang, Vienna, VA (US); Nien C. King, Vienna, VA (US)

(73) Assignee: International Business Machines Corporation, Armonk, NY (US)

(*) Notice: Subject to any disclaimer, the term of this patent is extended or adjusted under 35 U.S.C. 154(b) by 83 days.

This patent is subject to a terminal disclaimer.

(21) Appl. No.: 13/776,797

(22) Filed: Feb. 26, 2013

(65) Prior Publication Data
US 2014/0244234 A1    Aug. 28, 2014

(51) Int. Cl.
*G06F 17/28* (2006.01)
*G06F 17/27* (2006.01)
*G06F 17/22* (2006.01)

(52) U.S. Cl.
CPC ...... *G06F 17/2818* (2013.01); *G06F 17/2223* (2013.01); *G06F 17/2705* (2013.01); *G06F 17/2765* (2013.01); *G06F 17/289* (2013.01)

(58) Field of Classification Search
None
See application file for complete search history.

(56) References Cited

U.S. PATENT DOCUMENTS

| 5,659,731 | A | 8/1997 | Gustafson |
| 2002/0174128 | A1 | 11/2002 | Govindarajan et al. |
| 2003/0229634 | A1* | 12/2003 | Li ........................ G06F 17/274 |
| 2003/0229635 | A1* | 12/2003 | Chaudhuri ........ G06F 17/30598 |

(Continued)

FOREIGN PATENT DOCUMENTS

| CN | 1730279 A | 2/2006 |
| CN | 1755669 A | 4/2006 |

(Continued)

OTHER PUBLICATIONS

The registry of standard Data, 2007 URL: https://web.archive.org/web/20071231093412/http:/www.xml.gov.hk/en/approved/person_chinese_name_v1_0.htm.*

(Continued)

*Primary Examiner* — Richa Mishra
(74) *Attorney, Agent, or Firm* — Mollborn Patents, Inc.; Fredrik Mollborn (57) ABSTRACT

Chinese name transliteration is described. A Chinese name including a surname followed by a given name is received. The received Chinese name is parsed into a surname and a given name by: identifying any dual-character surnames in the received Chinese name, by referencing a list of known Chinese surnames; identifying any single-character surnames in the received Chinese name, by referencing the list of known Chinese surnames; and identifying, among the remaining characters in the received Chinese name, any characters not belonging to a dual-character or a single-character surname as a given name. The identified surname and the identified given name are transliterated into a Mandarin Pinyin representation. The Mandarin Pinyin representation of the surname and the given name is normalized into a pre-determined representation.

8 Claims, 4 Drawing Sheets

(56) References Cited

U.S. PATENT DOCUMENTS

| | | | |
|---|---|---|---|
| 2007/0005586 A1* | 1/2007 | Shaefer, Jr. | G06F 17/2705 |
| 2007/0021956 A1 | 1/2007 | Qu et al. | |
| 2007/0162445 A1 | 7/2007 | Scriffignano | |
| 2009/0319257 A1* | 12/2009 | Blume | G06F 17/278 |
| | | | 704/7 |
| 2011/0137636 A1 | 6/2011 | Srihari et al. | |
| 2011/0282914 A1 | 11/2011 | Block et al. | |
| 2012/0016660 A1 | 1/2012 | Gillam et al. | |
| 2012/0016663 A1* | 1/2012 | Gillam | G06F 17/30634 |
| | | | 704/9 |
| 2012/0059646 A1 | 3/2012 | Georgiev et al. | |

FOREIGN PATENT DOCUMENTS

| | | |
|---|---|---|
| CN | 101542475 A | 9/2009 |
| CN | 102033879 A | 4/2011 |
| CN | 102193646 A | 9/2011 |

OTHER PUBLICATIONS

U.S. Appl. No. 13/777,608 Non-final Office Action. dated Apr. 2, 2015.

U.S. Appl. No. 14/490,259 Non-final Office Action. dated Feb. 24, 2015.

USPTO Non-final Office Action. U.S. Appl. No. 14/491,210. dated Apr. 16, 2015.

U.S. Appl. No. 14/490,259 Final Office Action. dated May 29, 2015.

U.S. Appl. No. 13/777,608 Final Office Action. dated Sep. 24, 2015.

U.S. Appl. No. 14/490,259 Non-final Office Action. dated Sep. 25, 2015.

USPTO Final Office Action. U.S. Appl. No. 14/491,210. dated Sep. 28, 2015.

USPTO Office Action. U.S. Appl. No. 14/491,210. dated Apr. 27, 2016.

USPTO Office Action. U.S. Appl. No. 13/777,608. dated Apr. 28, 2016.

USPTO Office Action. U.S. Appl. No. 14/491,210. dated Oct. 19, 2016.

USPTO Office Action. U.S. Appl. No. 13/777,608. dated Oct. 19, 2016.

U.S. Appl. No. 14/490,259 Office Action. dated Jun. 17, 2016.

U.S. Appl. No. 14/490,259 Office Action. dated May 4, 2017.

U.S. Appl. No. 14/490,259 Office Action. dated Dec. 12, 2016.

USPTO Office Action. U.S. Appl. No. 13/777,608. dated May 11, 2017.

USPTO Office Action. U.S. Appl. No. 14/491,210. dated May 11, 2017.

U.S. Appl. No. 14/490,259 Final Office Action. dated Dec. 31, 2015.

\* cited by examiner

CHINESE NAME TRANSLITERATION

BACKGROUND

The present invention relates to transliteration of characters, and more specifically, to transliteration of Chinese character names into Romanized names. As global travel becomes increasingly frequent, the need for name translation or transliteration from one language to another becomes more common, and standardizing the name transliteration process becomes increasingly important. Both the Chinese and Taiwanese governments, for example, have recently published official guidelines for Romanizing Chinese personal names. The two sets of guidelines are nearly identical and can be summarized as follows:

1. Use Mandarin Pinyin.
2. Observe the original surname (SN) given name (GN) order, with a space added between SN and GN.
3. Do not add a space between a two-character given name or a two-character surname, but insert an apostrophe to avoid ambiguity when the pronunciation of the second character begins with a vowel.
4. In the rare case where the surname field has two surnames (e.g., as seen in the names of some married women in Taiwan and Hong Kong), insert a hyphen between the two surnames.

In theory, these guidelines should be adhered to anywhere Romanized Chinese names are used, e.g. in international publications, information processing, international travel documents, etc. However, automatic systems that transliterate personal names based on the standard conventions do not exist. Most translation systems, such as Google Translate (available from Google Inc. of Mountain View, Calif.) and Systran (available from Systran S.A. of Paris, France), occasionally resort to Chinese character translation rather than transliteration of names. Such systems typically contain hundreds of millions of text documents or databases storing patterns of text that have already been translated by human translators and looks for patterns to help decide on the best translation. By detecting patterns in documents that have already been translated by human translators, these systems try to provide a statistical machine translation, rather than transliteration. Two serious issues are associated with these kinds of systems.

The first problem is that these systems do not always recognize names correctly. For example, in the Chinese name 欧阳进修, 欧阳 is a two-character surname and 进修 is a two-character given name. However, 进修 is also a meaningful phrase in Chinese, which means "to further one's education". Google Translate correctly transliterates the name 欧阳 to Ouyang, but translates 进修 to "education", instead of Jinxiu, which would be the correct transliterated form. Systran, on the other hand, recognizes 欧阳进修 as a name and transliterates it correctly. However, when replacing the two-character surname 欧阳 with the single character surname 欧, Systran translates the name 欧进修 to "European further education" because 欧 also means "Europe" in Chinese.

The second problem is that using databases to store known names and phrases may sometimes fail to distinguish the individual to whom the original name refers. For example, 李连杰, a famous Chinese Kung Fu star, is known as Jet Li by the western world. Google Translate always renders 李连杰 as Jet Li, regardless of whether the name refers to the Kung Fu star or not. Transliterating the name would yield "Li Lianjie," which could indeed belong to quite a few people not as famous as Jet Li. Another interesting example, 张三, is often used to refer to the 'average Joe' in Chinese but can also be a real name, "Zhang San." Google Translate never provides a transliteration, but rather always translates it to Joe Smith.

While the International Components for Unicode (ICU) has developed a Han-Latin module, which can be plugged in for Chinese transliteration, it is not geared specifically for personal name transliteration. Given a string of Chinese characters, the ICU's Han-Latin module simply inserts a space between two adjacent characters and transliterates each character into a Pinyin representation. For example, 江泽民 is turned into "Jiang Ze Min" instead of "Jiang Zemin." This can lead to problems in situations where names are required to be parsed into a surname (SN) field and a given name (GN) field. The name "Jiang Ze Min" can mistakenly be parsed into "GN=Jiang Ze" and "SN=Min" in the Romanized form.

Parsing Romanized Chinese names may be error-prone even if the SN GN order is not a problem. Most common Chinese surnames are single characters. However, there exist quite a few dual character surnames. Some people also have two surnames (two single or even two double character surnames). For example, the single character 欧 is a surname but it is also the first character of the dual character surname 欧阳. ICU transliterates the name 欧阳天 as "Ou Yang Tian," but it is not clear whether the SN is "OU" or "OU YANG," based on the transliterated form. Thus, there is a need for improved automated techniques for transliterating Chinese names into a Romanized form.

SUMMARY

According to various embodiments of the present invention, methods and apparatus are provided, including computer program products, for Chinese name transliteration. A Chinese name including a surname followed by a given name is received. The received Chinese name is parsed into a surname and a given name by: identifying any dual-character surnames in the received Chinese name, by referencing a list of known Chinese surnames; identifying any single-character surnames in the received Chinese name, by referencing the list of known Chinese surnames; and identifying, among the remaining characters in the received Chinese name, any characters not belonging to a dual-character or a single-character surname as a given name. The identified surname and the identified given name are transliterated into a Mandarin Pinyin representation. The Mandarin Pinyin representation of the surname and the given name is normalized into a pre-determined representation.

The details of one or more embodiments of the invention are set forth in the accompanying drawings and the description below. Other features and advantages of the invention will be apparent from the description and drawings, and from the claims.

DETAILED DESCRIPTION

The various embodiments described herein pertain to Chinese transliteration using an automatic Chinese transliterator with a standardized transliteration module, which adheres to the Chinese official guidelines and accurately transliterates Chinese names into a Romanized form, where SN and GN are correctly parsed and represented. More specifically, to facilitate the name matching system and prevent the correct SN and GN identification from being lost during the transliteration process, the automatic Chinese transliterator performs three basic processing steps: (1) name parsing, (2) name transliteration, and (3) name normalization. The Chinese transliterator parses original Chinese names into SN and GN fields before names are transliterated. It then transliterates the SN and GN fields, leveraging the ICU Han-Latin module. Since the ICU Han-Latin module is not optimized for transliterating Chinese names, the final step normalizes the ICU output into representations that better reflect actual Romanized Chinese naming conventions.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
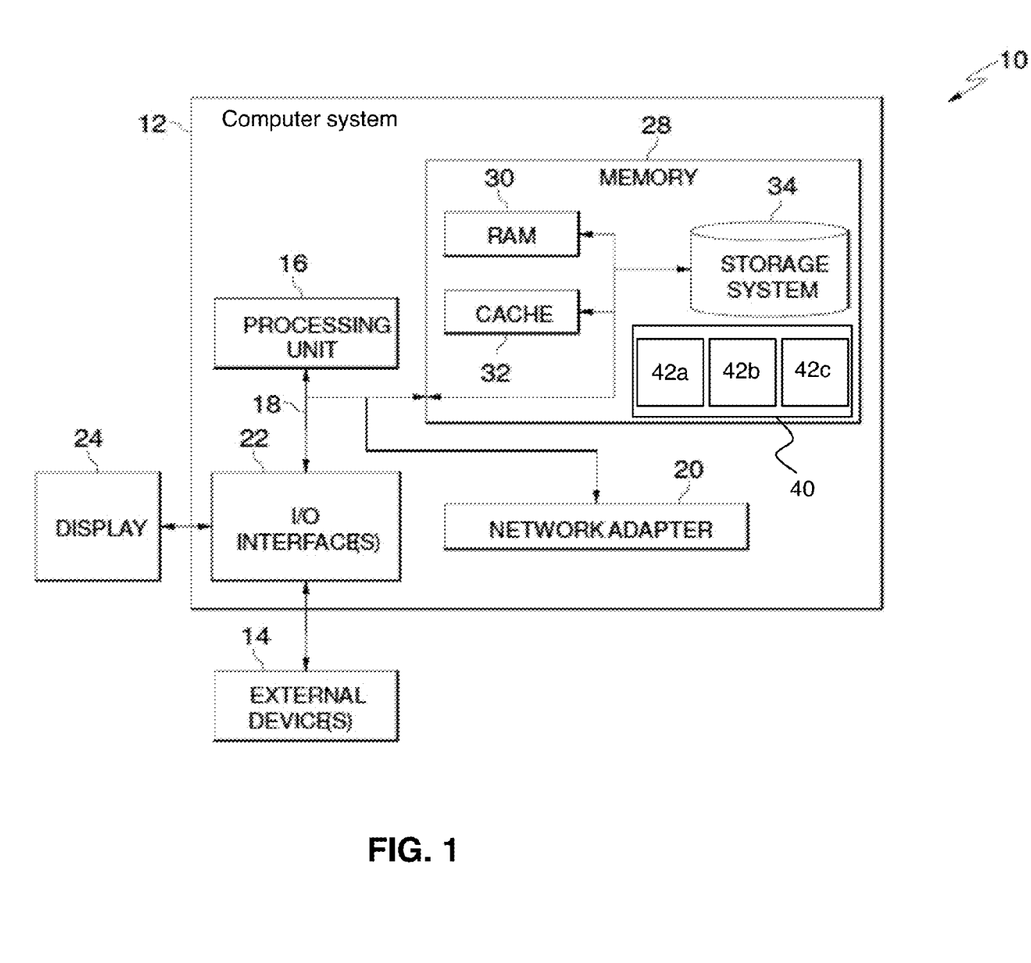
FIG. 1 shows a computer system (10) in accordance with one embodiment, into which the Chinese personal name transliteration can be implemented.

Referring now to FIG. 1, a schematic of an example of a Chinese name transliterator (10) is shown. It should be noted that the Chinese name transliterator (10) is only one example of a suitable Chinese name transliterator and is not intended to suggest any limitation as to the scope of use or functionality of embodiments of the invention described herein.

The Chinese name transliterator (10) includes a computer system 12, which is operational with numerous other general purpose or special purpose computing system environments or configurations, as described above. The computer system (12) may be described in the general context of computer system executable instructions, such as program modules, being executed by a computer system. The computer system (12) may be practiced in distributed cloud computing environments where tasks are performed by remote processing devices that are linked through a communications network. In a distributed cloud-computing environment, program modules may be located in both local and remote computer system storage media including memory storage devices.

As shown in FIG. 1, the computer system (12) in Chinese name transliterator (10) is shown in the form of a general-purpose computing device. The components of the computer system (12) may include, but are not limited to, one or more processors or processing units (16), a system memory (28), and a bus (18) that couples various system components including the system memory (28) to the processor (16).

As will be further depicted and described below, the memory (28) may include at least one program product having a set (e.g., at least one) of program modules that are configured to carry out the functions of embodiments of the invention. A Program/utility (40), having a set of program modules (42a-c), may be stored in the memory (28) by way of example, and not limitation, as well as an operating system, one or more application programs, other program modules, and program data. Each of the operating system, one or more application programs, other program modules, and program data or some combination thereof, may include an implementation of a networking environment. The program modules (42a-c) generally carry out the functions and/or methodologies of embodiments of the invention as described herein. In one embodiment, the program modules (42a-c) include a Name Parsing Module (42a), a Transliteration Module (42b) (42b), and a Normalization Module (42c), as will be described in further detail below.

The computer system (12) may also communicate with one or more external devices (14) such as a keyboard, a pointing device, a display (24), etc.; one or more devices that enable a user to interact with computer system (12); and/or any devices (e.g., network card, modem, etc.) that enable the computer system (12) to communicate with one or more other computing devices. Such communication can occur via the Input/Output (I/O) interfaces (22). Still yet, the computer system (12) can communicate with one or more networks such as a local area network (LAN), a general wide area network (WAN), and/or a public network (e.g., the Internet) via a network adapter (20).

Figure 2:
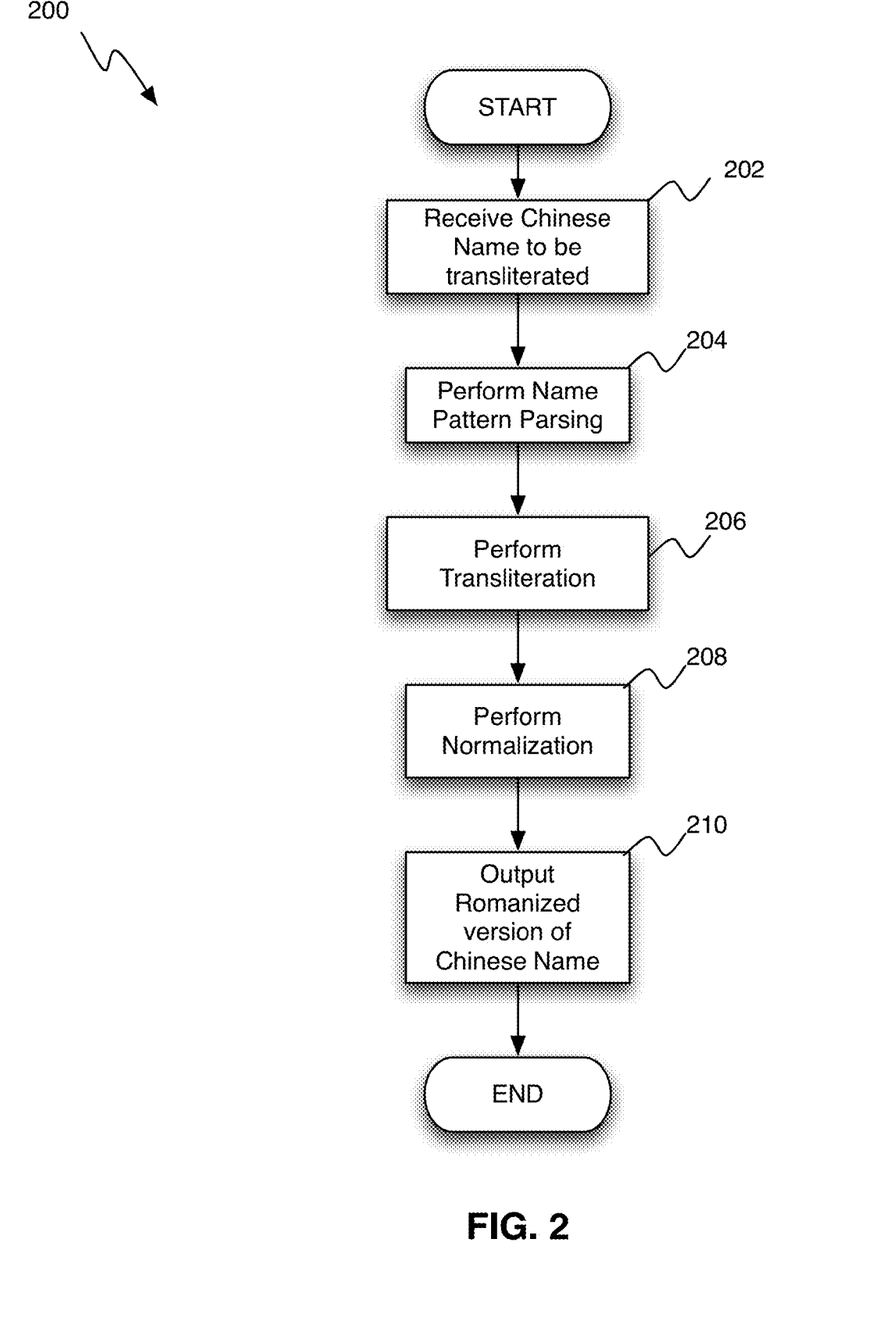
FIG. 2 shows a process (200) for Chinese personal name transliteration in accordance with one embodiment.

FIG. 2 shows a process (200) for Chinese personal name transliteration, which can be performed by the Chinese name transliterator (10) shown in FIG. 1, in accordance with one embodiment. As can be seen in FIG. 2, the process starts by receiving a Chinese personal name to be transliterated (step 202), for example by receiving a user input or reading characters from an electronic document.

Figure 3:
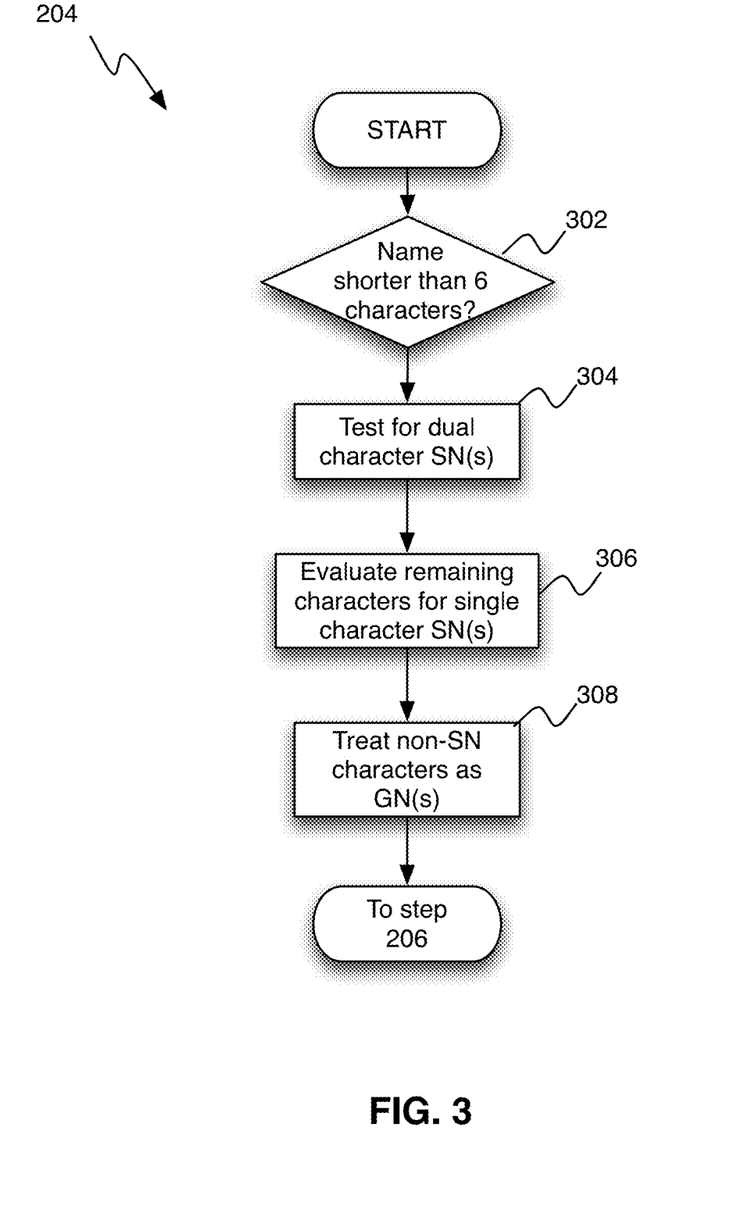
FIG. 3 is a more detailed view of the name pattern parsing step 204 of FIG. 2, in accordance with one embodiment.

Next, name pattern parsing is performed (step 204) by the Name Parsing Module (42a) in accordance with a Chinese name parsing algorithm. The name pattern parsing is illustrated in further detail in FIG. 3. The Chinese name parsing algorithm is based on a collection of common surnames and uses a large number of legitimate possible SN and GN patterns. While the number of characters in a Chinese surname can range from one to four, the most common surnames has a single character, and there is only a small percent of two-character surnames that are in common use. Chinese surname fields may also contain one or two surnames. Chinese given names may use one or two characters. In the illustrated embodiment, name pattern parsing proceeds as follows:

A possible Chinese full name can be as short as two characters in length or as long as six characters. Thus, it is first examined whether the name is longer than six characters (step 302). If the name is longer than six characters, the Chinese name is not parsed, and the process returns to step 206 of FIG. 2, where the name is transliterated, as will be described in further detail below. If the Chinese name is shorter than six characters, the name pattern parsing continues. It should be noted that in some embodiments, incomplete Chinese names, that is, those containing only a single character, are still subject to the parsing process to determine whether the character is more likely to be an SN or a GN.

For the name parsing, the Chinese name characters are assumed to be in a "SN GN" order. Native Chinese names in Chinese characters are nearly universally represented in SN GN order. Thus, the parsing of the Chinese name characters typically occurs in a left-to-right order to first identify the SN, followed by the GN. In rare cases where that order does not apply, the names are transliterated without parsing, with the Romanized forms then being parsed by the name parsing algorithm internal to a name matching system.

Various parsing patterns are applied depending on the length of a Chinese full name. For example, names with three to five characters can have more than one possible pattern. The multiple patterns are ordered such that priority is given first to dual character surnames and then to two character given names. Thus, the name pattern parsing continues as follows. First, names are tested for one or more dual-character surnames, using the collection of possible surnames (step 304). Next, any remaining characters that are not identified as dual-character surnames in step 304 are evaluated for one or more single-character surnames (step 306). After this step, any remaining Chinese characters that are not surnames are treated as given names (step 308). This ends the name pattern parsing step, and the process returns to step 206 of FIG. 2, where the identified GN(s) and SN(s) are transliterated, as will be described below.

The following examples illustrate some results of the name parsing algorithm of FIG. 3.

Example 1: Former Chinese Politician 江泽民

江 is a single-character surname. Neither 泽 nor 民 is a surname and will therefore be treated as a GN character. SN=[江] GN=[泽民].

Example 2: 王李卓華

Both 王 and 李 are single-character surnames. SN=[王] [李] GN=[卓華]

Example 3: 欧阳进修

欧阳 is a two-character surname. 进 and 修 are not surnames so it becomes a two-character given name. SN=[欧阳] GN=[进修]

Example 4: 端木李

端木 is a two-character surname. 李 is a single character surname. However since 李 is in the last position, it is treated as a given name. SN=[端木] GN=[李]

Example 5: 欧阳诸葛弘茹

Both 欧阳 and 诸葛 are dual-character surnames. SN=[欧阳] [诸葛] GN=[弘茹]

Figure 4:
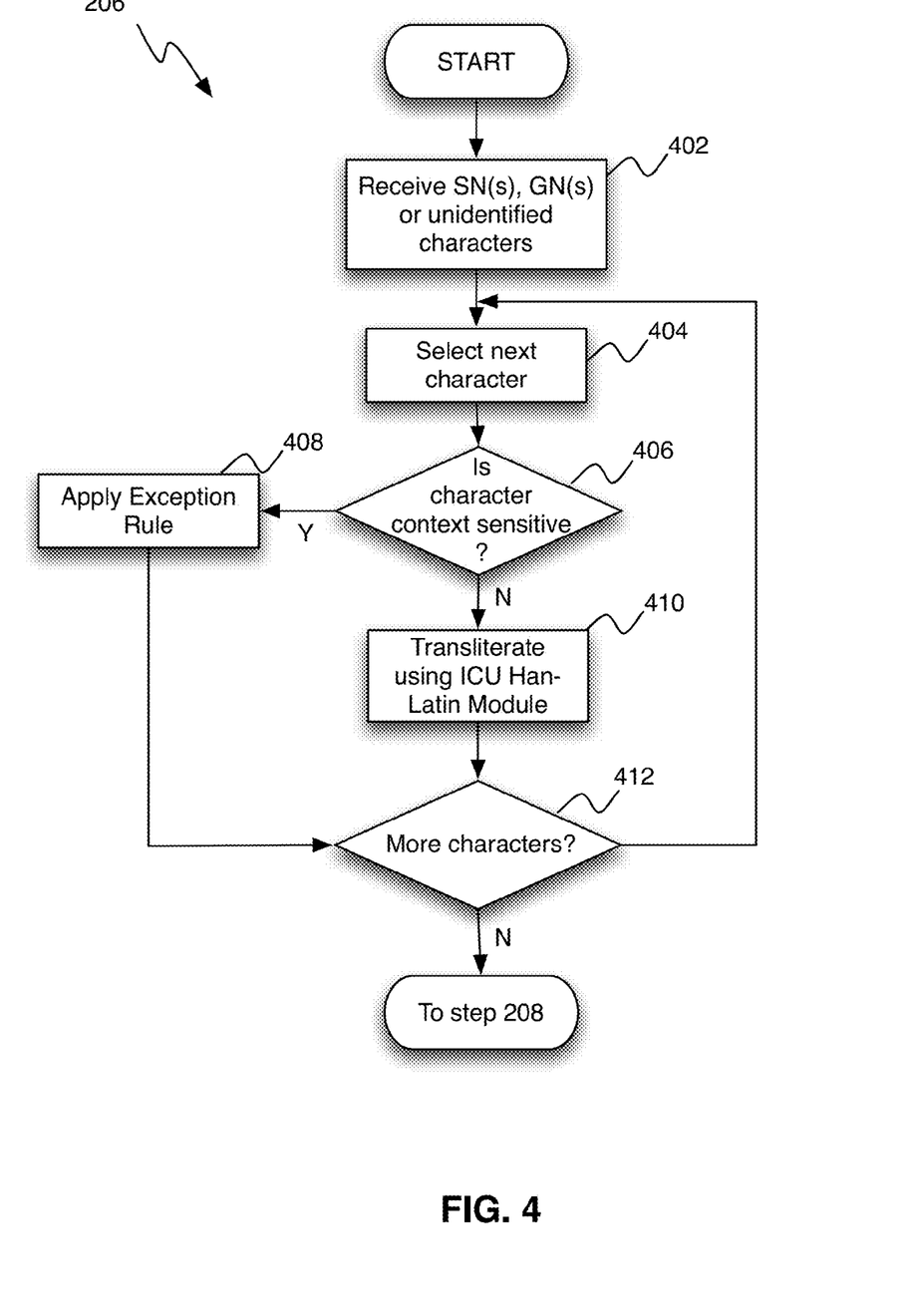
FIG. 4 is a more detailed view of the transliteration step 206 of FIG. 2, in accordance with one embodiment Like reference symbols in the various drawings indicate like elements.

After the name pattern parsing has been done, the process continues by performing a transliteration (step 206). This step is illustrated in further detail in FIG. 4. As can be seen in FIG. 4, any SN(s) and GN(s) identified in step 204 are received, as well as any other characters that could not be parsed into a SN or GN (step 402). As was described above, in one embodiment, the process takes advantage of the ICU Han-Latin module to transliterate names. Names are transliterated regardless of whether Name Pattern Parsing is successful. What makes the parsed names different from unparsed names is that the SN and GN structure can be preserved during transliteration, hence facilitating name matching.

A character is then selected (step 404), and it is determined whether the character is a context-sensitive character (step 406). For example, in some rare cases, a Chinese character's pronunciation is sensitive to the name field in which it occurs. If it is determined in step 406 that the character is context sensitive, then the character is set to bypass the ICU Han-Latin module and be handled by a special exception rule, (step 408). For example, 仇 in a surname field will be transliterated to QIU via a context-sensitive rule rather than being translated as CHOU by ICU Han-Latin. Characters not yet supported by Han-Latin are either handled by new transliteration rules if their pronunciations can be determined or assigned a special string indicating an unhandled transliteration exception that should be handled in a name matching system internally.

If it is determined in step 406 that the character is not context-sensitive, then the character is transliterated using the ICU Han-Latin Module (step 410). After transliterating the character in step 410 (or after applying the exception rule in step 408), the process checks whether there are any more characters to be transliterated (step 412). If there are more characters, the process returns to step 404 and selects another character, as described above. When there are no more characters to be transliterated, the process returns to step 208 of FIG. 2, as will be described below.

Once the transliteration is complete, the process performs normalization of the transliterated name (step 208). As is well known to those of ordinary skill in the art, Han-Latin supports the extended Latin character set and uses diacritics to indicate tones. During the normalization step 208, such tonal markers are removed. Symbols that are added during the parsing and transliteration phases are deleted or replaced so that the final output conforms to a format dictated by the application that uses the Transliteration Module (42b). Finally, the Romanized version of the Chinese name is output (step 210), which marks the end of the process (200). It should be noted that while the above techniques have been described by way of example and with reference to Chinese names, they can be modified by those of ordinary skill in the art, such as they can be applied to languages other than Chinese.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A non-transitory computer program product for Chinese name transliteration, by a Chinese transliterator, into a Romanized form of the Chinese name, wherein the Chinese transliterator includes a standardized transliteration module, the computer program product comprising a computer readable storage medium having program code embodied therewith, the program code being executable by a processor to perform a method comprising:
   receiving, by the transliterator, a sequence of characters representing a Chinese surname and a Chinese given name;
   parsing, by a name parsing module of the transliterator, the received sequence of characters into a Chinese surname and a Chinese given name by:
      first, identifying any dual-character Chinese surnames in the received sequence of characters, by referencing a list of known Chinese surnames,
      second, identifying any single-character Chinese surnames in the received sequence of characters, by referencing the list of known Chinese surnames, and
      third, identifying, all remaining characters not belonging to a dual-character or a single-character Chinese surname in the received sequence of characters as a given name;
   transliterating, by a transliteration module of the transliterator, the identified Chinese surname and the identified Chinese given name into a Mandarin Pinyin representation, wherein transliterating further comprises:
      determining whether a pronunciation of a character is sensitive to the name field in which the character occurs, in response to determining that the pronunciation of the character is not sensitive to the name field, transliterating the character using a Han-Latin module, and in response to determining that the pronunciation of the character is sensitive to the name field, bypassing the Han-Latin module and using a context-sensitive exception rule; and normalizing, by a normalization module of the transliterator, the Mandarin Pinyin representation into a Mandarin Pinyin representation having no diacritic symbols.

2. The computer program product of claim 1, wherein the name parsing uses a collection of common surnames to identify possible Chinese surname and Chinese given name patterns in the received sequence of characters.

3. The computer program product of claim 1, wherein the name parsing is applied only when the received sequence of characters is six characters or shorter in length.

4. A transliterator for Chinese name transliteration into a Romanized form of the Chinese name, comprising:

a parsing module operable to parse a received sequence of characters representing a Chinese surname and a Chinese given name by:

first, identifying any dual-character Chinese surnames in the received sequence of characters, by referencing a list of known Chinese surnames, second, identifying any single-character Chinese surnames in the received sequence of characters, by referencing the list of known Chinese surnames, and third, identifying, all remaining characters not belonging to a dual-character or a single-character Chinese surname in the received sequence of characters as a given name;

a transliteration module operable to transliterate the identified Chinese surname and the identified Chinese given name into a Mandarin Pinyin representation, wherein transliterating further comprises:

determining whether a pronunciation of a character is sensitive to the name field in which the character occurs, in response to determining that the pronunciation of the character is not sensitive to the name field, transliterating the character using a Han-Latin module, and in response to determining that the pronunciation of the character is sensitive to the name field, bypassing the Han-Latin module and using a context-sensitive exception rule; and a normalization module operable to normalize the Mandarin Pinyin representation into a Mandarin Pinyin representation having no diacritic symbols.

5. The transliterator of claim 4, wherein the parsing module uses a collection of common surnames to identify possible Chinese surname and Chinese given name patterns in the received sequence of characters.

6. The transliterator of claim 4, wherein the name parsing is applied only when the received sequence of characters is six characters or shorter in length.

7. The computer program product of claim 1, wherein identifying dual-character and single-character surnames is done in a left-to-right order.

8. The transliterator of claim 4, wherein identifying dual-character and single-character surnames is done in a left-to-right order.

* * * * *